E. TAYLOR.
ATTACHMENT FOR SEED PLANTERS.
APPLICATION FILED JULY 27, 1910.

973,824.

Patented Oct. 25, 1910.

Witnesses
Frank R. Elon
H. C. Rodgers

Inventor
Edwin Taylor
By George F. Thorpe Atty.

UNITED STATES PATENT OFFICE.

EDWIN TAYLOR, OF EDWARDSVILLE, KANSAS.

ATTACHMENT FOR SEED-PLANTERS.

973,824.  Specification of Letters Patent.  Patented Oct. 25, 1910.

Application filed July 27, 1910. Serial No. 574,150.

*To all whom it may concern:*

Be it known that I, EDWIN TAYLOR, a citizen of the United States, residing at Edwardsville, in the county of Wyandotte and State of Kansas, have invented certain new and useful Improvements in Attachments for Seed-Planters, of which the following is a specification.

This invention relates to seed planters and has for its object the production of an attachment whereby the seed dropped by the planter will be efficiently and reliably covered and which is susceptible of attachment to any seed planter equipped with runners and hollow legs leading thereto and of adjustment to meet all conditions of service.

To this end the invention consists in certain novel and peculiar features of construction and organization as hereinafter described and claimed; and in order that it may be fully understood reference is to be had to the accompanying drawing, in which—

Figure 1:
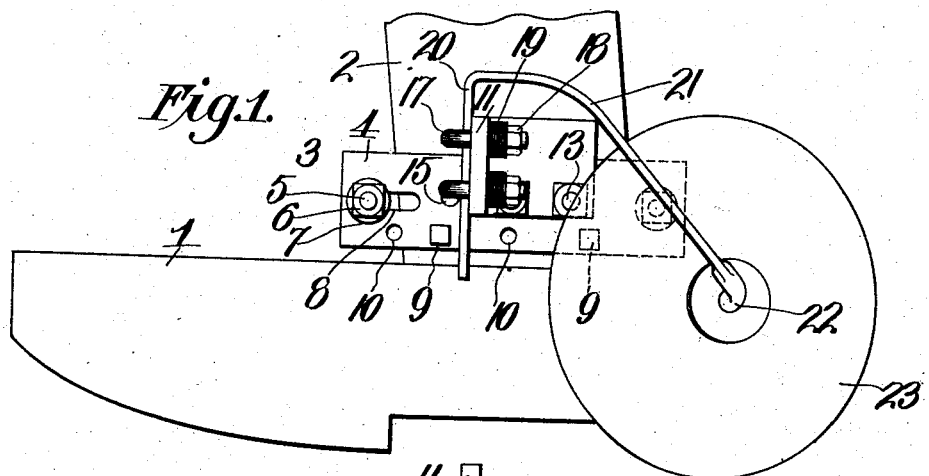
Figure 2:
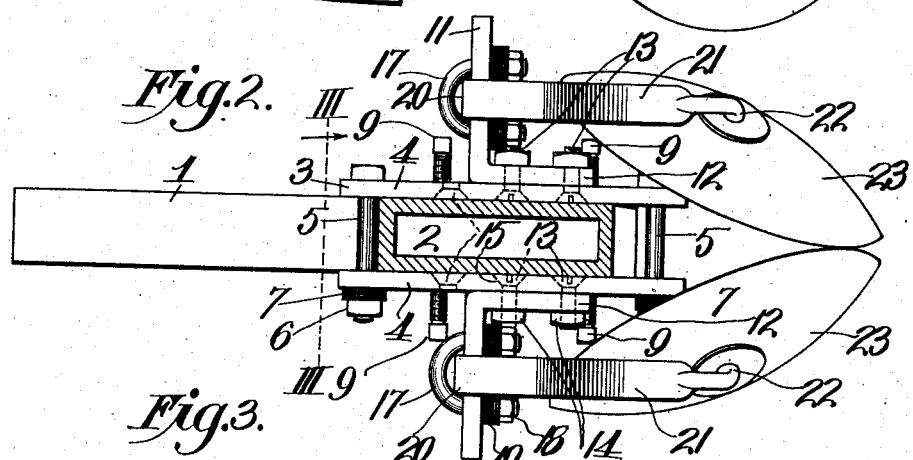
Figure 3:
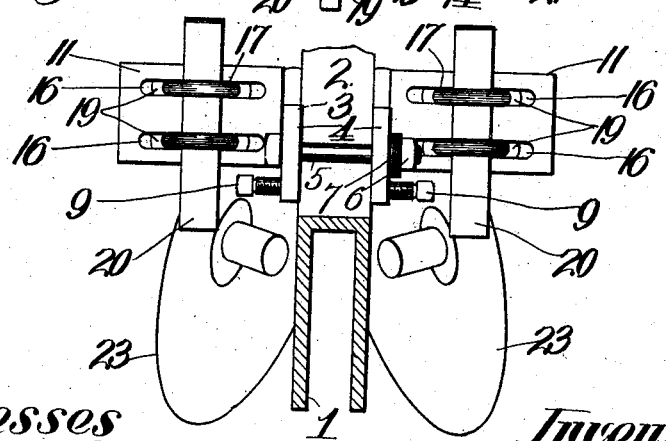

Figure 1, is a side view of a leg and runner of a seed planter equipped with a seed covering attachment embodying my invention. Fig. 2, is a view showing the leg in horizontal section and the attachment and runner in top plan view. Fig. 3, is a vertical section on the line III—III of Fig. 2.

In the said drawing, 1 indicates a runner of a seed planter and 2 the hollow leg communicating therewith.

3 is a clamp secured upon the leg and constructed as follows: 4 indicates a pair of bars extending longitudinally of the machine and fitting against opposite sides and near the lower end of said leg and connecting said bars forward and rearward of the leg are bolts 5 engaged at their threaded ends by nuts 6 and washers 7, the washers fitting loosely on the bolts between the nuts and the adjacent bar 4, the use of a sufficient number of washers permitting the bars 4 to be clamped firmly upon the leg and in order that the bolts may be disposed apart a distance approximately equal to the width of the leg from front to rear, slots 8 are provided in said bars wherein one of the bolts may be longitudinally adjusted.

9 are cap screws mounted in threaded openings 10, in the lower parts of bars 4 for engagement with opposite sides of the leg 2, to assist in holding the clamp at the desired point of adjustment, the said cap screws being especially serviceable for holding the clamp upon a leg which may be more or less rounded upon its sides, the one shown having flat sides. The bars 4 are provided with extra holes 10, to permit the cap screws 9 to be disposed at the most convenient point for engagement with legs of different size and form.

11 are arms projecting outwardly from the clamp and to reliably and easily secure the said arms to the clamp they are provided with lugs 12, to fit against and give an extended bearing on the clamp and extending through said lugs and bars 4 with their heads countersunk in the latter are bolts 13, engaged at their outer or threaded ends by nuts 14 whereby the lugs are clamped firmly against said bars, there being sufficient holes 15 in bars 4 to permit of longitudinal adjustment of the arms 11 upon the clamp. The arms 11 are each provided with a pair of substantially horizontal slots 16, one above the other and extending through said slots are U-bolts 17 engaged at their threaded ends by nuts 18, and equipped between the ends and arms 11 with washers 19.

A pair of arch shaped spring metal arms are arranged longitudinally at opposite sides of the clamp the front portions 20 extending downward through the U-bolts at the front sides of arms 11 in which position they are rigidly clamped. The arched arms are provided at their rear ends 21 with inturned journals 22, upon which are rigidly secured as shown or otherwise the rearwardly converging coverers 23, the coverers being preferably of the disk type as they will perform their covering function efficiently and cut through or override trash which would be collected by the ordinary type of coverer, though it is to be understood that I do not wish to restrict myself to the use of the rotary disk coverers.

In practice the seed drops down through the legs and runners into the furrow and the disks turn earth from either side inward and cover the seed and upon encountering unyielding obstructions ride over the same with but little chance of being injured as would be the case if the disks were incapable of upward movement independent of the planter, it being obvious that the arched arms will yield upwardly to permit the disk to move upwardly as explained.

From the above description it will be apparent that I have produced a seed planter possessing the features of advantage enumerated as desirable and I wish it to be understood that I reserve the right to make all changes properly falling within the spirit and scope of the appended claims.

Having thus described the invention what I claim as new and desire to secure by Letters Patent, is:

1. A seed planter attachment, comprising a clamp for attachment to the seed planter, arms projecting outwardly from the clamp, a pair of longitudinal arms carried by and projecting rearwardly from said first-named arms, and a pair of coverers carried by said longitudinal arms and susceptible of upward movement to pass over unyielding obstructions.

2. A seed planter attachment, comprising a clamp for attachment to the seed planter, arms projecting outwardly from the clamp, a pair of longitudinal arms carried by and projecting rearwardly from said first-named arms, and a pair of coverers carried by said longitudinal arms and susceptible of upward movement to pass over unyielding obstructions; each set of longitudinal arms being susceptible of adjustment vertically, laterally, and around a horizontal axis with respect to said first-named arms.

3. A seed planter attachment, comprising a clamp for attachment to the seed planter, arms projecting outwardly from the clamp, a pair of longitudinally arranged arched arms of spring metal, secured at their front ends to the first-named arms, and a pair of coverers attached to the rear ends of said arched spring arms.

4. A seed planter attachment, comprising a clamp for attachment to the seed planter, arms projecting outwardly from the clamp, a pair of longitudinally arranged arched arms of spring metal, secured at their front ends to the first-named arms; each of said arched arms being susceptible of adjustment vertically, laterally and around a horizontal axis with respect to one of said first-named arms and coverers attached to said arched arms.

5. The combination with the hollow leg of a seed planter of a clamp secured thereto arms projecting outwardly from the clamp, a pair of longitudinal arms carried by and projecting rearwardly from said first-named arms, and a pair of coverers carried by said longitudinal arms and susceptible of upward movement to pass over unyielding obstructions.

6. The combination with the hollow leg of a seed planter of a clamp consisting of a pair of longitudinally extending bars fitting against opposite sides of the leg, tie bolts connecting said bars and clamping them upon the leg, set screws mounted in said bars and engaging opposite sides of the leg, arms at opposite sides of said bars and provided with flanges at their inner ends fitting against and longitudinally adjustable on said bars; said arms being each provided with a pair of substantially horizontal slots one above the other, U bolts extending through said slots, inverted arch-shaped arms fitting at their front ends against said slotted arms and through said U-bolts, means engaging said U-bolts and the slotted arms to clamp the arched arms rigidly in position, and a disk coverer carried by and bearing a journaled relation to the rear end of each of said arched arms.

In testimony whereof I affix my signature, in the presence of two witnesses.

EDWIN TAYLOR.

Witnesses:
 HELEN C. RODGERS,
 G. Y. THORPE.